June 7, 1966     F. R. HAYS     3,255,003
METHOD OF MAKING CATHODE RAY TUBE FACE PLATES
Filed Sept. 18, 1961     2 Sheets-Sheet 1
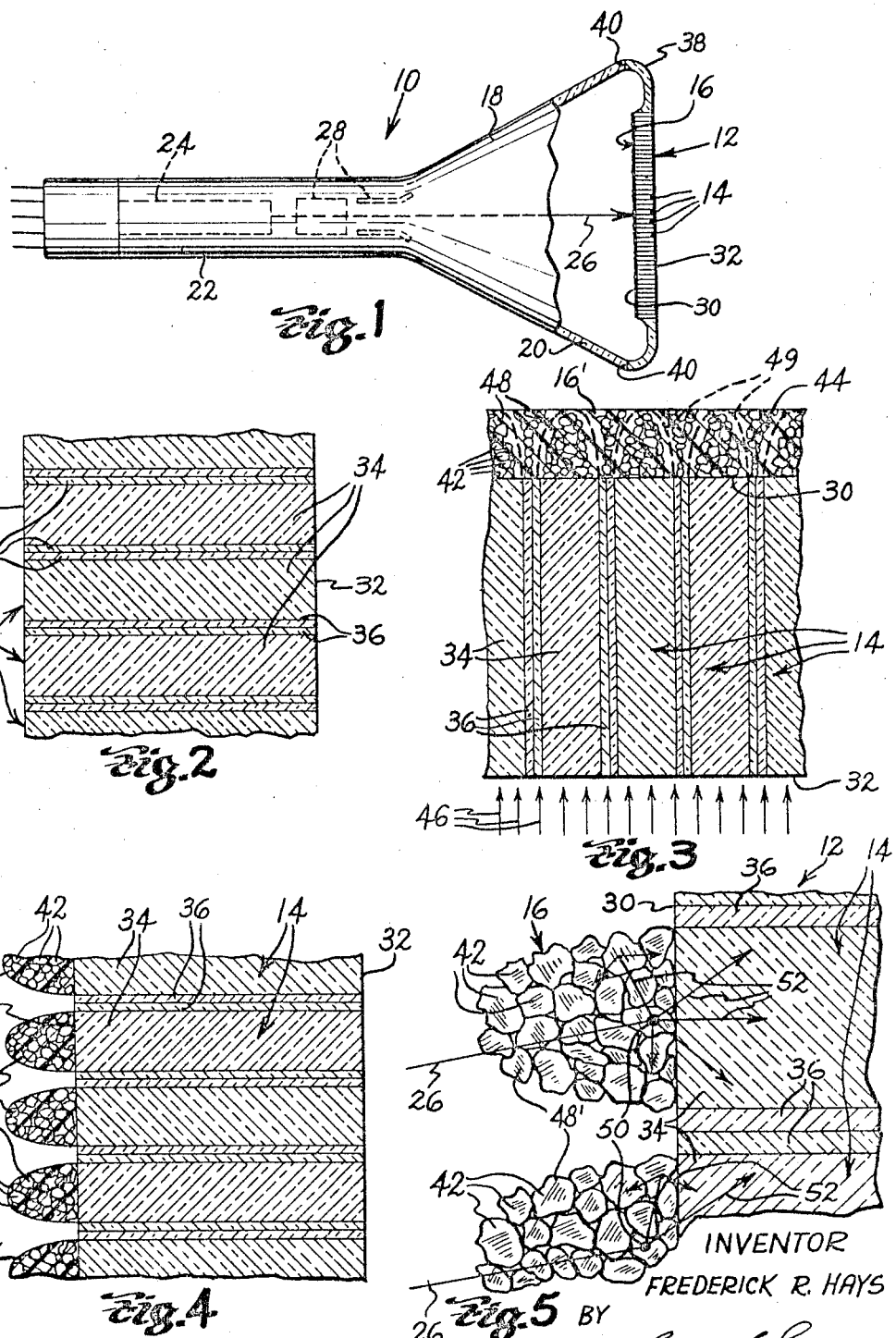
INVENTOR
FREDERICK R. HAYS
BY
Louis L. Gagnon
ATTORNEY

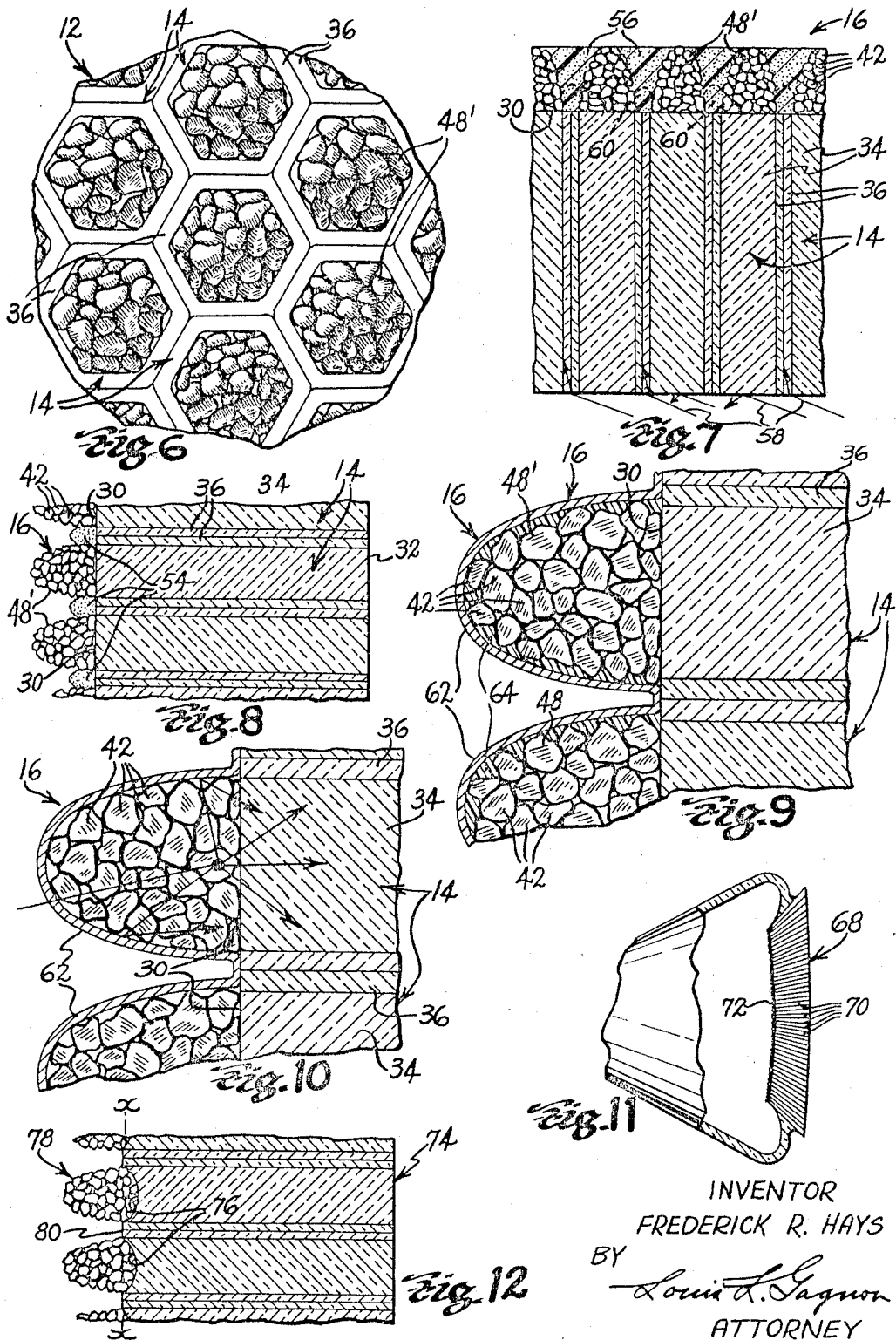

3,255,003
METHOD OF MAKING CATHODE RAY TUBE FACE PLATES

Frederick R. Hays, East Woodstock, Conn., assignor to American Optical Company, Southbridge, Mass., a voluntary association of Massachusetts
Filed Sept. 18, 1961, Ser. No. 138,895
6 Claims. (Cl. 96—35)

This invention relates to improvements in cathode ray tubes of the type embodying face plates formed of a plurality of optical fibers bundled together in side-by-side relation with each other and has particular reference to improved cathodoluminescent screens for such face plates and method of making the same.

It is well known that the image resolving powers of fiber optical cathode ray tube face plates are, in general, superior to those of the more conventional onepiece glass face plates in transferring optical images formed by phosphors used for cathodoluminescence. However, a disturbing amount of image degradation resulting from the spread and intermixing of light which forms adjacent elements of an image pattern still exists in fiber optical face plates having conventional phosphor screens.

In the application of phosphors to fiber optical face plates one must be concerned about the inherent spread of light from a point source or electron spot in the phosphor screen which, in addition to illuminating the primary fiber, will partially illuminate or get into adjacent fibers. The spreading of light into fibers other than the one intended to receive light from a particular electron spot degrades the overall picture image so that the resolution thereof does not approach the fiber size or the electron spot size, but instead is limited by the scatter of light in the phosphor screen.

In order to achieve full benefit of the exceptional image resolving power of the bundle of fiber optical elements which make up the face plates, it is essential that light spreading from electron spots on the phosphor screens be confined substantially within the immediate area of the particular electron spot and/or the area of the light-receiving face of the fiber adjacent said spot.

Various screen structures have been devised heretofore in an attempt to improve the resolving power of fiber optical face plates. These have involved the use of cellular masking structures having opaque or light reflecting walls attached to the face plates or etched recesses in the fiber ends which pocket the phosphors and tend to reduce light spreading.

While such schemes have improved the image resolving power of face plates to some degree particularly over that obtainable with the usual continuous phosphor coating, they are, for the most part, commercially impractical. That is, intricate masking devices having cells approaching fiber sizes of only a few microns in diameter are difficult, costly and generally impractical to fabricate and the application of such structures to fiber face plates with the cells thereof in properly registered relation with the fibers adds further complication and expense to this approach in attempting to isolate areas of phosphors on cathode ray tube screens. Etched recesses in the fiber ends of face plates formed of exceptionally small fibers are also relatively costly and time-consuming to produce and while this technique relieves one of some of the problems of registration of isolated phosphors with the fiber ends, filling the resultant very small etched recesses to uniform depths with granular phosphor materials and without overlap from one fiber recess to another presents many problems and involves costly procedures.

Schemes of the above character fall short in providing practical solutions to the problems of isolating areas of phosphors on cathode ray tube screens and for the most part they do not accomplish the ultimate in isolation of electron spots wherein all light from a particular spot over the light receiving end of a particular fiber should be prevented from entering other adjacent fibers and/or the cladding materials surrounding the fibers.

The present invention provides practical means and method for accomplishing substantially the ultimate in isolation of light from electron spots produced upon fiber optical cathode ray tube face plates.

Accordingly, a principal object of the invention is to provide a fiber optical cathode ray tube face plate having a cathodoluminescent screen formed of phosphors applied to a side of the face plate upon the ends of the optical fibers thereof in such a manner as to provide the resultant face plate with an image resolving power approaching that of its optical fiber size and method of making the same.

Another object is to provide a method of making face plates of the above character which is relatively simple, economical and dependable in duplication.

Another object is to provide a face plate embodying a plurality of light-conducting core parts exposed at their opposite ends and otherwise surrounded by integral light-insulating claddings joined together in intimate bundled relation with each other to form composite oppositely disposed end faces on said plate, one of which is provided with a cathodoluminescent screen comprised of individually isolated deposits of phosphor material each in precise registry with and attached to a respective one of the core parts of said fibers.

Another object is to provide on fiber optical structures phosphor deposits of the above character which are externally coated with reflective material to render the same highly internally reflective to light produced therein.

Another object is to provide a face plate structure of the above character and novel method of making the same wherein said isolated deposits of phosphor materials may be formed to any practical depths required so as to be at least equal to or slightly greater than the optimum depth for penetration of electrons fired thereinto and thereby offer the benefit of the full charges of said electrons in rendering said phosphors luminescent.

Another object is to provide a phosphor screen structure of the above character wherein the application of higher electron acceleration velocities in cathode ray tubes and consequently increased brilliance of illumination is made possible without sacrifice of image resolution and definition.

A still further object is to provide a unique process for producing a cathodoluminescent screen upon a fiber optical face plate structure formed of individually clad light-conducting fibers wherein said screen comprises a plurality of deposits of phosphors applied to the end faces of the light-conducting core portions of said clad fibers and spaced from each other by the respective claddings of said fibers.

Other objects and advantages of the invention will become apparent from the following description when taken in conjunction with the accompanying drawings in which:

FIG. 1 is a partially broken away diagrammatic illustration of a cathode ray tube having a fiber optical face plate of the type relating to this invention;

FIG. 2 is a greatly enlarged fragmentary cross-sectional view of the fiber optical structure of the cathode ray tube face plate;

FIG. 3 is a view similar to FIG. 2 illustrating steps in the process of providing the fiber optical structure with a cathodoluminescent screen of the character of this invention;

FIG. 4 diagrammatically illustrates the basic screen structure resulting from the process of the invention;

FIG. 5 is an enlarged fragmentary portion of the structure in FIG. 4;

FIG. 6 is a greatly enlarged fragmentary elevational view of the surface of the screen and fiber optical structure of the invention;

FIG. 7 diagrammatically illustrates a technique for modifying and improving the screen structure shown in FIGS. 4 and 5;

FIG. 8 illustrates the results of the technique employed in FIG. 7;

FIGS. 9 and 10 are diagrammatic illustrations of another technique for modifying and improving the basic screen structure shown in FIGS. 4, 5 and 6;

FIG. 11 illustrates the basic screen structure of the invention as applied to a slightly modified fiber optical plate; and FIG. 12 illustrates another modification of the invention.

Referring more particularly to the drawings wherein like characters of reference designate like parts throughout the several views, there is shown diagrammatically in FIG. 1 a cathode ray tube 10 which, instead of embodying the more conventional homogeneous glass face plate, is provided with a face plate 12 formed of an assembly of optical fibers 14. In addition to the fibers 14, the face plate 12 embodies a cathodoluminescent screen 16 of unusual construction and character and which, in combination with the fiber optical assembly, is the primary subject of this invention.

The cathode ray tube 10 embodies a glass envelope 18 having a generally bell-shaped forward portion to which the face plate 12 is attached and a neck portion 22 of reduced size which contains the usual cathode and electron gun arrangement 24 for firing an electron stream 26 at the screen 16. The stream 26 is caused to trace across the screen 16 by beam deflection means 28 which, in electrostatically operated tubes, is placed within the neck portion as illustrated at 22. In electromagnetically operated tubes the beam deflection means would encircle the neck 22 at approximately the same location as in conventional tubes of this nature.

The screen 16 is formed of luminescent materials which, as energy converters, become luminous when bombarded by the electrons of the stream 26 and through the usual control of the trace pattern of the electron stream and the sequence of emission of electrons from the gun, a luminous picture image is produced by the screen 16 on the inner side 30 of the face plate 12 and transferred by the fiber elements 14 thereof to the front or outwardly disposed surface 32 for viewing purposes or for purposes of exposing photosensitive papers, films or plates or the like which may be placed against the surface 32.

The fibers 14 of the face plate 12 each embody a core section 34 (see FIG. 2) of optical glass or the like having a relatively high index of refraction surrounded by a relatively thin cladding 36 of material having a relatively low index of refraction. By way of example, a typical fiber 14 construction might embody a core 34 formed of optical flint glass or the like having an index of refraction of approximately 1.75 with a cladding 36 formed of crown or soda lime glass or the like having an index of refraction of approximately 1.52. The cladding should be of a thickness equal to approximately 1/10 the overall diameter of the fiber. It is pointed out that lanthanum containing glasses or barium containing glasses may be substituted for the above-mentioned flint core glass. A lanthanum containing glass having an index of refraction of approximately 1.69 would, for example, be suitable.

The fibers 14 may be of any desired cross-sectional size such as, for example, 4 or 5 microns in diameter or preferably smaller than the size of electron spots produced in the screen 16 by the beam 26. The selection of fiber size is made in accordance with the image resolving power desired of the face plate 12 wherein the smaller fibers produce face plates having higher image resolving powers provided the fiber sizes are not so small as to approach the particular wavelength of light produced by the screen.

In forming the face plate 12, the fibers 14 are grouped together in intimate side-by-side relation and fused or otherwise joined along their respective sides in such a manner as to produce a vacuum tight structure which is leakproof when subjected to the usual vacuum provided within the tube envelope 20 in the completed structure of FIG. 1. While an extremely thin sealing layer of glass or the like may be provided over the outer surface 32 of the face plate 12 to insure against leakage between the fibers 14, such a practice might degrade the image resolving power of the face plate to some extent and is avoided whenever possible. Vacuum tight fiber optical face plate structures such as shown in the drawings which are formed without sealing layers can be produced readily and are preferred. The fibers 14 may be initially circular, hexagonal, square or of a variety of other cross-sectional shapes and when fused under heat and pressures they assume a vacuum tight interfitting relationship. It will become apparent hereinafter that the cross-sectional configurations of the fibers 14 do not, in any way, affect the process of the invention relating to the fabrication of the screen 16.

The fiber optical structure may be heat sealed or glass soldered edgewise directly into or over an opening provided in the forward end of the cathode ray tube envelope and thereafter treated through the neck of the envelope to apply the phosphor screen 16 thereto in accordance with this invention. However, in view of the awkwardness and obvious difficulties which would be encountered in working through the neck of the tube envelope 18, it is preferable to form the phosphor screen 16 upon the face plate 12 prior to making the assembly of the envelope and face plate. This approach will be described hereinafter but it should be understood that the process of the invention is applicable either to a completed assembly of the face plate and envelope of the tube or to a face plate structure alone which is to be subsequently attached to the envelope.

In this latter instance and in order to render the face plate 12 more easily applicable to the tube envelope, it is preferably edge fused and/or glass soldered into a glass annulus or the like 38 (FIG. 1) which has expansion and heat softening characteristics approximating those of the tube envelope 20. After having formed the phosphor screen 16 upon the face plate, the unit embodying the face plate 12 and integral annulus 38 is flame sealed or otherwise fused at 40 to the tube envelope 20.

Referring now to the forming of the luminescent screen 16 upon the fiber optical structure of the face plate 12, the side 30 thereof which is to receive the screen 16 (see FIG. 2) is provided with a finish such as to render it readily receptive to light produced by the screen 16. The surface 30 ordinarily would be ground and optically polished but the use of a fine ground surface texture on the surface 30 should not be excluded. Either of the above surface treatments are applicable to this invention for the reason that the phosphors which form the screen are placed directly upon the surface 30 and light produced by the phosphors will enter the fibers 14 through either a fine ground or optically polished surface 30. In practically all cases, however, the opposite image receiving surface 32 of the fiber structure is optically polished for viewing or other image receiving purposes.

The screen 16 is formed on the surface 30 of the fiber optical structure by first placing upon the surface 30 a continuous layer 16' (FIG. 3) of phosphor material 42 suspended in a vehicle or suspension medium 44 of photosensitive material which is adherent to glass. The layer 16' is formed to a predetermined uniform depth and may be applied by any one of a number of methods including knife coating, squeegee application, settling, electrophoresis or a slurry and spin technique. The layer 16' thickness should be at least equal to or slightly thicker than the final maximum thickness or depth desired of the finished screen 16.

In making up the layer 16', the phosphors 42 are selected and/or modified to have a particle size smaller than the cross-sectional sizes of the respective fiber elements 14 and are also selected from the many varieties presently used in the fabrication of commercially known cathode ray tube screens and must possess the particular characteristics desired of the ultimate screen 16 in accordance with the intended purpose of the cathode ray tube which is to receive the same. The phosphor material 42 must be an efficient converter of energy, have an ability to produce high instantaneous intrinsic brightness and it must be stable under electron bombardment.

The suspension medium 44 (see FIG. 3) for the phosphors 42, in addition to being photosensitive or hardenable when exposed to actinic light (i.e. light within the ultraviolet and blue region of the spectrum or within the range of from approximately 3500 Angstroms to 5000 Angstroms), must be of such viscosity as to support the phosphors and be adherent to the glasses of the fiber elements 14. For reasons which will become apparent hereinafter, the medium 44 must also be removable with a solvent where not exposed to actinic light and further characterized to be substantially non-soluble in the particular solvent wherever hardened by exposure to said light.

Various compositions having the above-mentioned characteristics and which are suitable for carrying out the process of this invention are commercially available. These are known to the trade as organic photoresists and solvents of above-mentioned character which are referred to in the trade as "developers" are usually supplied therewith.

By way of example, a non-commercial suspension medium 44 suitable for use in forming the layer 16' might comprise a highly water soluble polyvinylalcohol dope containing controlled amounts of ammonium or potassium dichromate prepared as follows:

A polyvinylalcohol-water solution in the proportions of from 3 to 10 grams of highly water soluble polyvinylalcohol dope thoroughly mixed in 100 cc. water is first prepared. In approximately 100 cc. of the above polyvinylalcohol-water solution, from .1 to .5 gram of either ammonium dichromate or potassium dichromate is added and thoroughly mixed with the polyvinylalcohol-water solution. The phosphor material 42 is next added to the above mixture in amounts sufficient to substantially fill the said mixture and render it viscous enough for application by the particular technique desired. For example, if the mixture is to be applied by knife coating, it should be of a heavier consistency than if it is intended to be flowed onto the fiber structure. In all cases, however, it should be substantially self supporting once applied to the fiber structure. Variations in the above proportions of water to polyvinylalcohol will also control the resultant viscosity of the layer 16'.

It is pointed out that in the above composition, commercial gelatin or carboxy methyl cellulose (C.M.C.) may be substituted for the polyvinylalcohol.

After having applied the layer 16' to the fiber structure, by any one of the above-mentioned techniques, actinic light is directed upon the side 32 thereof as indicated by the arrows 46. The light rays 46 are directed substantially straight onto the fiber optical structure as shown, or at various angles relative to the plane of the side 32 which are at least within the aperture or maximum acceptance angle of the core parts 34 of the fibers 14. The aperture angle of the fibers 14 can be determined from the relationship $\sin \mu = \sqrt{n_1^2 - n_2^2}$ wherein $\mu$ represents the aperture half angle, $n_1$ represents the index of refraction of the core glass and $n_2$ represents the index of refraction of the cladding glass. In this way of directing the light 46, all of the rays thereof impinging upon the respective end faces of the fibers 14 which make up the surface 32 will be transferred by total internal reflection through the fiber core parts 34. Light entering the lower index material of claddings 36 will tend to travel therefrom into the higher index material of core parts 34 adjacent surface 32. Thus, the claddings 36 will be substantially dark or non-illuminated adjacent the opposite surface 30 of the fiber structure. The portions of the layer 16' which overlie the core parts 34 of the fibers 14 will, accordingly, be exposed to the actinic light while the in-between portions thereof which overlie the claddings 36 will be substantially unexposed to said light. In FIG. 3, the approximate areas 48 of the layer 16' which become exposed to the light 46 are bounded by dotted outlines 49. These areas 48 become hardened while the areas therebetween and disposed over the claddings 36 remain substantially unchanged in character and readily dissolvable in whatever solvent is applicable to the particular material used in forming the layer 16'.

After having exposed the areas 48 of the layer 16' to the light 46 for a period sufficient to fully harden the same, the unhardened areas of the layer 16' are washed away or removed by the solvent. Where commercial photoresists are used in making up the layer 16' the time of exposure to actinic light required for proper hardening is recommended by the supplier of the particular photoresist selected for use and a solvent or developer, as it is called, is usually provided with the photoresist as purchased or proper solvents for the photoresist are specified.

In the case where the layer 16' is made up of polyvinylalcohol, water and ammonium or potassium dichromate as set forth hereinabove, an exposure time of approximately 1 minute or from ½ to 6 minutes to actinic light from a conventional photoflood lamp which has a color temperature of approximately 3200 Kelvin and is projected approximately ⅓ of a watt/sq. in. on the surface 32 of the fiber optical structure is sufficient to properly harden the areas 48 when the layer 16' is of a normal thickness approximately equal to a fiber diameter, and when the fiber optical structure is, for example, approximately ¼ of an inch in thickness (i.e. when the fibers 14 are approximately ¼ of an inch in length).

Mercury arc lamps, of course, may be used for a greater concentration of actinic light 46. When the core parts 34 of the fibers 14 are approximately ¼" in length and formed of the above-mentioned flint glass, they will transmit approximately 60% of the 3650 Angstrom line of mercury. Further, by way of example, it has been found that fibers of the above character will have a transmission range to actinic light of from approximately 8% at 3500 Angstroms to 85% at 4500 Angstroms and above. Actinic light normally has a range of from approximately 3500 Angstroms to 5000 Angstroms.

With fibers 14 having core parts approximately ¼" long and formed of lanthanum containing glass having an index of refraction of approximately 1.69, these core parts would have a transmission range of from approximately 50% at 3500 Angstroms to approximately 85% at 4000 Angstroms and above.

In all cases, the exposure time for properly hardening the areas 48 of the layer 16' is determined in accordance with the fiber 14 length (thickness of the face plate 12), the transmission characteristics of the particular core glass used in the initial fabrication of the fibers and the type of lamp or light source used to produce the light 46. A maximum exposure time of 6 minutes is sufficient for all practical purposes. The thickness of the layer 16' may be formed greater or less than a fiber diameter in special cases and, in such cases, the exposure time would be adjusted accordingly to be longer than the above given examples for layers thicker than a fiber diameter and shorter for layers thinner than a fiber diameter. In all instances, the thickness of the layer 16' should be sufficient to produce areas 48 which have a front to back or axial dimension at least somewhere near equal to the anticipated maximum depth to which electrons will penetrate the said areas in the finished screen when in use in a cathode ray tube. This depth of penetration of electrons in phosphor deposits is determined in accordance with the accelerating potentials applied to the cathode ray tube gun 24. The relationship between depth of penetration of electrons fired into phosphors and the accelerating potentials are well known and in order to obtain full benefit of the energy of the electrons, their energy should be fully dissipated in the phosphor material.

Removal of the areas of unhardened material of the layer 16' when formed of polyvinylalcohol, water and potassium or ammonium dichromate would be accomplished with a water wash in which this mixture, when unhardened, is soluble.

Once the unhardened areas of the layer 16' are dissolved and washed away as shown in FIG. 4, the face plate structure is baked in an oven or furnace for a period of from 15 to 45 minutes at a temperature of from 350° F. to 450° F. The duration of the baking cycle and temperatures used are controlled within the above approximate ranges in accordance with the size or volume of the individual areas 48 (FIG. 4) so as to substantially completely burn out the material of the suspension medium 44. The burn-out during baking tends to bond the phosphor particles 42 to each other and to the respective ends of the fibers 14 as shown in FIG. 5 and, at the same time, removes all organic substances from the side of the resultant face plate 12 which is to be subsequently sealed within the tube envelope. It is well known in the tube industry that the sealed-in areas of cathode ray tube parts must be free of organic substances which if allowed to be present in the evacuated space within the tube, would produce corrosive or otherwise damaging gases within the tube when it is put into operation.

Referring now to FIG. 5 it can be seen that the screen 16 resulting from the above process comprises a plurality of phosphor deposits 48' attached to and extending away from only the core parts 34 of the fibers 14. These deposits, or phosphor nodules 48' as they will be referred to hereinafter, each contain a plurality of phosphor particles 42 but, in themselves, are individually isolated completely from one another by the thicknesses of the adjoining claddings of the fibers 14. Moreover, because of the uniformity in thickness of the initial layer 16 (FIG. 3) the nodules 48' are each substantially of a uniform size.

With the resultant face plate 12 in assembled relation with the tube envelope 20 as shown in FIG. 1 and with the tube 10 operating, an electron spot 50 from the beam 26 (see FIG. 5) which strikes and penetrates into a particular phosphor nodule 48' will, by energy conversion, inherently cause the phosphor particles 42 therein to become luminescent and give off light in all directions as indicated by the arrows 52. Substantially all of this light which is directed toward the particular fiber core having the nodule 48' thereon will pass into the said core and on through the fiber to the side 32 of the face plate 12. Other light from the immediate area of the electron spot 50 will be diffused within the nodule 48' and eventually reach and enter the fiber core or be dissipated by absorption within the nodule 48'. Only a very small percentage of light will reach and exit through the outer exposed boundaries of the nodule 48' and of this small percentage of light which might find its way outwardly through the boundary of a particular nodule 48', only a negligible amount thereof would enter another adjacent nodule 48' and even less than this amount entering another nodule 48' would eventually find its way into the core part of another fiber 14. Moreover, substantially no light will be generated in regions other than the core. Therefore, with the above basic screen construction 16, it can be seen that practically complete isolation of image light produced adjacent each respective fiber core end face is accomplished so that image light intended to be transmitted by one fiber is practically completely prevented from illuminating its cladding or other adjacent fibers and the face plate 12 is provided with an image resolving power substantially equal to that of the fiber structure of the face plate as determined by the fiber size.

In order to assure absolute isolation of light produced in one nodule 48' from another, the screen 16 may be further treated as shown in FIGS. 7 and 8 or 9 and 10.

In FIGS. 7 and 8, the treatment embodies the provision of opaque light absorbing fillers 54 between each of the phosphor nodules 48'.

This is accomplished as shown in FIG. 7 by partially filling the space between the nodules 48' of the screen 16 with an opaque photosensitive medium 56 which, for reasons given above, must be of an inorganic nature and not capable of giving off gases when exposed to the internal atmosphere of an operating cathode ray tube. For this purpose, a frit of opaque or other light absorbing glasses or powdered metals or the like initially suspended in a medium of photosensitive material such as described above may be used. In such a case, where using the polyvinylalcohol, water and potassium or ammonium dichromate suspension medium described above, the suspension of the glass frit in the medium 56 would be applied to the screen 16 as shown in FIG. 7 so as to fill the spacings between the phosphor nodules 48'. Ultra-violet light indicated by the arrows 58 is then directed glancingly onto the surface 32 of the face plate 12 with the rays thereof impinging at angles outside the maximum aperture or acceptance angle of fiber core parts. In so doing, the rays of light striking the lower index claddings of the fibers will enter the same and pass therethrough and across adjacent core parts into other claddings to eventually reach and expose the photosensitive medium 56 above the claddings causing it to harden approximately throughout the areas bounded by the dotted outlines 60. The excess and non-hardened portion of the suspension medium is then washed away to expose the major portions of the surface areas of the phosphor nodules 48' as shown in FIG. 8. The resultant face plate is again baked as described hereinabove to burn out the suspension medium 56 leaving the deposit of opaque or light absorbing glass frit between the phosphor nodules 48'. It is pointed out that in forming the structure shown in FIG. 8 one might eliminate the inital step of burning out the suspension medium in the nodules 48' and perform this operation simultaneously with the burning out of the suspension medium 56. The resultant deposits or fillers 54 then function to absorb minute portions of light produced in the nodules 48' which might otherwise have a tendency to stray therefrom into the fiber claddings or across into adjacent nodules 48' near the side 30 of the fiber structure.

Treatment of the screen 16 as shown in FIGS. 9 and 10 embodies the provision of a metallic or other known suitable light-reflecting coating 62 over the nodules 48' of phosphors. In accordance with the usual effect resulting, for example, from aluminizing phosphor screens, the coatings prevent back scattering of light and, in the present instance of surrounding the nodules 48', they additionally provide substantially complete isolation of light produced in each particular nodule 48'. The coatings 62, like all such coatings on conventional phosphor screens are of low mass so that the electron beam is not appreciably attenuated in penetrating the coatings 62.

The coating 62 is applied in the conventional manner of so treating a phosphor screen wherein a thin coating 64 (FIG. 9) of cellulose nitrate in a volatile solvent is applied to the phosphors in such manner as to completely cover the phosphor nodules 48'. In so doing, the cellulose nitrate fills in the irregularities on the outer surface of the nodules 48' and provides each nodule with a smooth outer surface which is to receive the metallic coating 62. The organic cellulose nitrate coating is then air dried and the metallic coating (preferably aluminum) is evaporated to a desired thickness (approximately from 0.01 to 1 micron) upon the resultant relatively smooth outer surface of the cellulose nitrate coating. Finally, the cellulose nitrate coating is burned out by again baking the face plate for from 15 to 45 minutes at a temperature of from 350° C. to 450° C. Removal of the cellulose nitrate thereby avoids the possibility of gases being formed therefrom during operation of the cathode ray tube which receives the particular face plate so treated. Also the resultant relatively smooth inner surface of the metallic coating 62 provides highly reflective means for containing light produced by the phosphors within their respective coated nodules 48' and further, by such light-reflecting action, causes an increased amount of illumination to be directed toward and to enter the respective core part of the fiber 14 to which its particular nodule 48' is attached. In addition, the aluminum coatings could also function to conduct away any space charge which would decrease the electron velocity and the resultant phosphor brightness.

From the above it can be seen that the basic face plate structure of the invention or those modified as shown in FIGS. 7–10 each embody a screen 16 comprised of isolated nodules of phosphors, each and every one of which is disposed in precise registry over and upon a respective one of the fibers and separated from each other by the thickness of the fiber claddings. This construction provides the ultimate in fiber optical face plates intended for use in cathode ray tubes and the process of the invention is applicable to fiber face plate structures formed of fibers of all shapes and sizes with an assurance of duplication when mass produced.

While fibers of substantially uniform cross-sectional sizes throughout their length have been shown and thus far described for purposes of illustrating the product and process of the invention, it is to be understood that a tapered bundle 68 formed of tapered clad fibers 70 may be provided with a phosphor screen 72 which is identical to the screen 16 described hereinabove (see FIG. 11). Furthermore, such a bundle 68 might be arranged to have its larger face 76 disposed within the cathode ray tube envelope in which case, the screen 72 would be applied to said larger face. That is, the screen 72 may be provided on either the smaller or the larger faces of the plate 68 depending upon which face thereof is to be ultimately disposed within the cathode ray tube envelope. In applying such a phosphor screen to a tapered fiber optical structure, the above-outlined process for fibers of uniform diameters would be followed. Also, as shown in FIG. 12, the phosphor screens 16 or 72 may be applied to fiber bundles such as 74 (FIG. 14) whose core parts are recessed as by etching or the like in the manner indicated by the reference numeral 76. This allows a somewhat thicker build-up of phosphor materials in the resultant screen 78 without producing an excessive build up of phosphors beyond the general plane x—x of the face 80 which receives the phosphor nodules.

From the foregoing, it can be seen that novel means and method have been provided for accomplishing all of the objects and advantages of the invention. Nevertheless, it should be apparent that many changes in the details of construction, arrangement of parts or steps of the methods may be made without departing from the spirit of the invention as expressed in the accompanying claims. The invention, therefore, is not to be limited to the exact matters shown and described as only preferred matters have been given by way of illustration.

Having described my invention, I claim:

1. The method of producing a luminescent screen upon one side of a fiber optical structure formed of the corresponding one ends of a plurality of optical fibers all bundled and secured together in side-by-side relationship as a unit, said fibers each having a core of relatively high refractive index light-conducting material surrounded by a cladding of material have a refractive index of a predetermined lower value thna that of said core to provide said fibers with a known aperture angle within which rays of light directed onto ends of said fibers will be transferred by internal reflection through said cores of said fibers substantially without being transferred through the claddings thereof, said method comprising placing upon said one side of said structure a continuous overlying layer of luminescent material suspended in a photosensitive matrix medium adapted to become hardened when exposed to actinic light, causing rays of actinic light to become incident upon the ends of said fibers opposite to said one ends thereof within said aperture angle to cause said light to expose substantially only discrete portions of said layer overlying respective cores of said fibers at said one side of said structure and removing remaining relatively unexposed portions of said layer to isolate said exposed portions thereof one from the other.

2. The method of producing a luminescent screen upon one side of a fiber optical structure formed of the corresponding one ends of a plurality of optical fibers all bundled and secured together in side-by-side relationship as a unit, said fibers each having a core of relatively high refractive index light-conducting material surrounded by a cladding of material having a refractive index of a predetermined lower value than that of said core to provide said fibers with a known aperture angle within which rays of light directed onto ends of said fibers will be transferred by internal reflection through said cores of said fibers substantially without being transferred through the claddings thereof, said method comprising placing upon said one side of said structure a continuous overlying layer of luminescent material suspended in a thermally degradable photosensitive matrix medium adapted to become hardened when exposed to actinic light, causing rays of actinic light to become incident upon the ends of said fibers opposite to said one ends thereof within said aperture angle to cause said light to expose and harden substantially only discrete portions of said layer overlying respective cores of said fibers at said one side of said structure, removing remaining relatively unexposed and unhardened portions of said layer to isolate said hardened portions thereof one from the other and heating said hardened portions to a temperature sufficient to burn out matrix material therein and cause substantially only said luminescent material to remain discretely on said core parts of said fibers.

3. The method of claim 1 including the step of coating said remaining luminescent material with a relatively thin metallic material.

4. The method of producing a luminescent screen upon one side of a fiber optical structure formed of the corresponding one ends of a plurality of optical fibers all bundled and secured together in side-by-side relationship as a unit, said fibers each having a core of relatively high refractive index light-conducting material surrounded by a cladding of material having a refractive index of a predetermined lower value than that of said core to provide said fibers with a known aperture angle within which rays of light directed onto ends of said fibers will be transferred by internal reflection through said cores of said fibers substantially without being transferred through the claddings thereof, said method comprising placing upon said one side of said structure a continuous overlying layer of luminescent material suspended in a photosensitive thermally degradable matrix medium adapted to become hardened when exposed to actinic light, causing rays of actinic light to become incident upon the ends of said fibers opposite to said one ends thereof within said aperture angle to cause said light to expose and harden substantially only discrete portions of said layer overlying respective cores of said fibers at said one side of said structure, removing remaining relatively unexposed and unhardened portions of said layer to isolate said hardened portions thereof one from the other, placing a light absorbent glass material between said hardened portions of said layer and, at one stage of said process, heating said hardened portions to a temperature sufficient to substantially completely burn out said thermally degradable matrix medium.

5. The method of claim 4 including the step of coating the combination of said luminescent and light absorbent materials with a relatively thin layer of light-reflecting metallic material.

6. The method of producing a luminescent screen upon one side of a fiber optical structure formed of the corresponding one ends of a plurality of optical fibers all bundled and secured together in side-by-side relationship as a unit, said fibers each having a core of relatively high refractive index light-conducting material surrounded by a cladding of material having a refractive index of a predetermined lower value than that of said core to provide said fibers with a known aperture angle within which rays of light directed onto ends of said fibers will be transferred by internal reflection through said cores of said fibers substantially without being transferred through the claddings thereof while light rays directed onto said same ends of said fibers at angles outside said aperture angle will be transferred through said claddings substantially without being transferred through said cores, said method comprising placing upon said one side of said structure a continuous overlying layer of luminescent material suspended in a thermally degradable photosensitive matrix medium adapted to become hardened when exposed to actinic light, causing rays of actinic light to incident upon the ends of said fibers opposite to said one ends thereof within said aperture angle to expose to said light and harden substantially only discrete portions of said layer overlying respective cores of said fibers at said one side of said structure, removing remaining relatively unexposed and unhardened portions of said layer to isolate said hardened portions thereof one from the other, placing between said isolated portions a filler of light absorbent material suspended in a thermally degradable photosensitive medium adapted to become hardened when exposed to actinic light, directing rays of actinic light onto said opposite ends of said fibers along paths outside said aperture angle to illuminate and harden portions of said filler adjacent corresponding ends of said claddings, removing remaining unhardened portions of said filler and heating said structure to a temperature sufficient to substantially burn out said thermally degradable matrix medium in both said filler and said isolated hardened portions of said layer.

References Cited by the Examiner
UNITED STATES PATENTS

| | | | |
|---|---|---|---|
| 2,310,863 | 2/1943 | Leverenz | 117—33.5 |
| 2,767,457 | 10/1956 | Epstein. | |
| 2,845,691 | 8/1958 | Atherton et al. | 29—25.17 |
| 2,955,348 | 10/1960 | Healy | 29—25.17 |
| 2,958,801 | 11/1960 | Herriott | 313—92 |
| 2,983,835 | 5/1961 | Frey | 313—92 |
| 2,985,784 | 5/1961 | MacNeille | 313—92 |

OTHER REFERENCES

Levy et al., "The Preparation of Phosphor Screens for Color Television Tubes," A Sylvania Technical Article, April, 1953, pp. 1–7.

NORMAN G. TORCHIN, *Primary Examiner.*

JOHN HUCKERT, SAXFIELD CHATMON, Jr., ALEXANDER D. RICCI, *Examiners.*